United States Patent
Sleiman et al.

US008347848B2

(10) Patent No.: US 8,347,848 B2
(45) Date of Patent: Jan. 8, 2013

(54) INTERNAL COMBUSTION ENGINE (75) Inventors: Tony Sleiman, Windsor (CA); Andre Laba, Windsor (CA); Jessie Laba, Tecumseh (CA)

(73) Assignee: Vengeance Power Inc., Windsor, Ontario (CA)

( * ) Notice: Subject to any disclaimer, the term of this patent is extended or adjusted under 35 U.S.C. 154(b) by 834 days.

(21) Appl. No.: 12/085,442

(22) PCT Filed: Nov. 22, 2006

(86) PCT No.: PCT/US2006/045198
§ 371 (c)(1),
(2), (4) Date: Mar. 30, 2009

(87) PCT Pub. No.: WO2007/062116
PCT Pub. Date: May 31, 2007

(65) Prior Publication Data
US 2009/0223480 A1 Sep. 10, 2009

Related U.S. Application Data

(60) Provisional application No. 60/739,484, filed on Nov. 23, 2005.

(51) Int. Cl.
F02B 53/00 (2006.01)
F02B 53/04 (2006.01)
F01C 1/00 (2006.01)
F01C 1/344 (2006.01)
F04C 2/00 (2006.01)
F04C 18/00 (2006.01)

(52) U.S. Cl. ........ 123/243; 123/241; 123/235; 418/258; 418/259; 418/260; 418/264

(58) Field of Classification Search ................ 123/243, 123/241, 235; 418/258, 259, 260, 264, 267
See application file for complete search history.

(56) References Cited

U.S. PATENT DOCUMENTS

| 158,664 | A | * | 1/1875 | Adams ........................ 418/264 |
| 2,048,825 | A | * | 7/1936 | Smelser ...................... 123/231 |
| 2,071,799 | A | * | 2/1937 | Mabille ....................... 123/243 |
| 2,345,561 | A | * | 4/1944 | Allen, Jr. ..................... 418/264 |
| 2,498,029 | A | | 2/1950 | Clerc .......................... 418/267 |
| 3,001,482 | A | | 9/1961 | Osborn |
| 3,250,260 | A | | 5/1966 | Heydrich ..................... 123/243 |
| 3,301,193 | A | * | 1/1967 | Moore .......................... 418/36 |

(Continued)

FOREIGN PATENT DOCUMENTS

CN 1 459 549 12/2003
(Continued)

*Primary Examiner* — Thai Ba Trieu
(74) *Attorney, Agent, or Firm* — Warn Partners, P.C.

(57) ABSTRACT

An engine having a rotor including at least one slot and at least one combustion chamber used to form a cavity is provided. The engine also includes at least one vane rollably disposed in the slot, and a block for receiving the rotor, and having a first quadrant including an inlet port, a second quadrant, a third quadrant, and a fourth quadrant having an outlet port. The vane moves through the first quadrant, drawing air into the block and the cavity. The vane then moves through the second quadrant, compressing the air. The vane then moves through the third quadrant, combusting the air, and forcing the rotor to rotate. The vane then moves through the fourth quadrant, forcing the air out of the outlet port.

20 Claims, 12 Drawing Sheets

U.S. PATENT DOCUMENTS

| | | | |
|---|---|---|---|
| 3,301,233 A | 1/1967 | Dotto et al. | |
| 3,485,179 A | 12/1969 | Dawes | 418/265 |
| 3,568,645 A | 3/1971 | Grimm | |
| 3,904,327 A | 9/1975 | Edwards et al. | |
| 4,410,305 A | 10/1983 | Shank et al. | |
| 5,092,752 A | 3/1992 | Hansen | 418/137 |
| 5,375,985 A | 12/1994 | Pipaloff | 418/175 |
| 5,415,141 A | 5/1995 | McCann | 123/243 |
| 5,524,587 A | 6/1996 | Mallen et al. | |
| 5,711,268 A | 1/1998 | Holdampf | 123/243 |
| 6,120,271 A * | 9/2000 | Mallen | 418/265 |
| 6,321,713 B1 * | 11/2001 | Mallen | 123/243 |
| 6,386,172 B1 * | 5/2002 | Mallen | 123/243 |
| 6,659,067 B1 | 12/2003 | Al-Hawaj | |
| 6,681,738 B2 | 1/2004 | Endoh et al. | |
| 6,684,847 B1 | 2/2004 | Al-Hawaj | 123/243 |
| 6,688,276 B2 * | 2/2004 | Baptista et al. | 123/226 |
| 2005/0109294 A1 * | 5/2005 | Wondergem et al. | 123/44 R |

FOREIGN PATENT DOCUMENTS

| | | |
|---|---|---|
| DE | 3705079 A1 | 10/1987 |
| EP | 0 0007 180 A1 | 1/1980 |
| EP | 0 029 753 | 6/1981 |
| EP | 0130171 B1 | 6/1989 |
| GB | 150416 | 8/1920 |
| GB | 442418 | 2/1936 |
| JP | 63-151942 | 10/1988 |
| JP | 01-190980 | 8/1989 |
| JP | 02-238101 | 9/1990 |
| JP | 06-272568 | 9/1994 |
| JP | 10-068301 | 3/1998 |
| JP | 2005-25609 A | 9/2005 |
| SK | 9801388 A3 * | 7/2000 |
| SU | 1301987 A1 | 4/1987 |
| WO | WO 2007/062116 A1 | 5/2007 |

* cited by examiner

INTERNAL COMBUSTION ENGINE

CROSS-REFERENCE TO RELATED APPLICATIONS

This application claims the benefit of U.S. Provisional Application No. 60/739,484, filed Nov. 23, 2005.

This application is a National Stage of International Application No. PCT/US2006/045198 filed Nov. 22, 2006. This application claims priority to U.S. Provisional Patent Application No. 60/739,484 filed on Nov. 23, 2005. The disclosures of the above applications are incorporated herein by reference.

FIELD OF THE INVENTION

The present invention relates to an improved rotary type internal combustion engine.

BACKGROUND OF THE INVENTION

Internal combustion engines are generally known. The type of internal combustion engine most commonly used is an internal combustion engine having at least one piston disposed within a cylinder and connected to a crank shaft through the use of a connecting rod. The piston moves from the top of the cylinder to the bottom of the cylinder during operation, this is also referred to as stroke length. Air and fuel that is injected into the cylinder gets compressed as the piston moves toward the top of the cylinder. Once the air and fuel is compressed, it is combusted, forcing the piston to move downward in the cylinder. Air is repeatedly taken into the cylinder, compressed and combusted as the piston moves in the cylinder in a cyclical manner.

The motion of the piston moving in the cylinder is translated to the crank shaft through the connecting rod which translates the linear motion of the piston to rotational motion. The connecting rod has a bearing which is offset from the center of the crank shaft bearing and connected to the connecting rod. As the distance from the bearing to the center of the crank shaft is increased, the stroke length of the piston increases, and the ability to generate an increased amount of torque is increased as well. However, an increased stroke length also increases the amount of compression of the air inside the cylinder. One of the draw backs to an internal combustion engine is that increasing the compression of the air inside the cylinder can cause the air and fuel to combust prematurely. Therefore, in a conventional gasoline internal combustion engine, the stroke length, and hence the maximum torque which can be generated, is limited.

Also, the angle of the connecting rod also changes as the piston moves in the cylinder and the crankshaft rotates. The crank shaft is typically heavy in order to deal with the reciprocating motion of the piston in the cylinder. A great deal of heat and mechanical energy is wasted during this transfer of motion of the piston. The piston also has to stop at a "top dead center" position (the point at which the piston has moved to the top of the cylinder) during the combustion stroke. This allows valuable heat and energy that can be used to provide mechanical energy to escape. Approximately one third of the heat energy from combustion is lost through the cooling system and another third is lost through the exhaust system. This leaves one third of the heat energy from combustion to be used for mechanical energy.

The piston slides in the cylinder and relies on oil to minimize friction. In one portion of the stroke of the piston, the angle of the connecting rod is positioned such that the friction level on one side of the piston increases greatly. If the engine does not have an adequate cooling system, and oil lubrication, the piston would seize inside the cylinder under load. An oil pump is needed to generate significant pressure to keep the bearing sliding on a film of oil, or else the bearings will seize. This friction can also produce inconsistencies in power and reduce the efficiency of the engine. Other points of friction that are located in the valve train also inhibit efficiency as well.

Another type of engine is commonly referred to as a "rotary engine." This type of engine includes a rotor disposed within a housing, with the rotor mounted on a large circular lobe on an output shaft. The lobe is offset from the center of the output shaft, providing the leverage, and therefore torque necessary for operation. The rotor is typically three-sided, and creates three chambers inside the housing, one chamber for each side of the rotor. Each chamber changes size as the rotor rotates in the housing. As the rotor rotates, each chamber receives air from an intake port, and the air is then compressed in a similar manner to that of an internal combustion engine having pistons. The rotor will continue to rotate, and the air will be combusted, and forced out of an exhaust port. To help keep the chambers separate from one another, seals are used between the rotor and the housing to keep the air and fuel in each of the chambers from mixing.

However, these seals not only rotate in a circular manner with the rotor, but also rotate in an epitrochoidal manner, causing excessive wear in the seals. Also, typical rotary engines do not burn all of the fuel in the chamber during the combustion process due to the poor surface to volume ratio, which leads to reduced fuel economy and higher emissions.

Accordingly, there exists a need for an improved type of internal combustion engine which does not have the disadvantages of an internal combustion engine having pistons, such as poor utilization of combustion energy as mechanical energy, high friction, and being limited by the stroke length of the pistons; as well as not having the disadvantages of a rotary engine, such as poor sealing characteristics, poor fuel economy, and lower torque due to limited leverage at the output shaft.

SUMMARY OF THE INVENTION

The present invention is an internal combustion engine having a rotor operably associated with at least one vane to form at least one variable chamber, with the at least one vane having a first cam roller and a second cam roller. The invention also includes a block for receiving the rotor, with the block having an inlet and an outlet, and at least one roller cam operably associated with the first cam roller and the second cam roller, as well as an ignition source received by the block, operably associated with the variable chamber.

When the rotor rotates in the block, the at least one vane will change position relative to the rotor to vary the size of the at least one variable chamber, and when the variable chamber moves in proximity to the inlet, air will be drawn into the variable chamber, the variable chamber will compress the air, the ignition source will ignite fuel mixed with the air to cause the variable chamber to expand, and the variable chamber will move in proximity to the outlet, discharging the air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
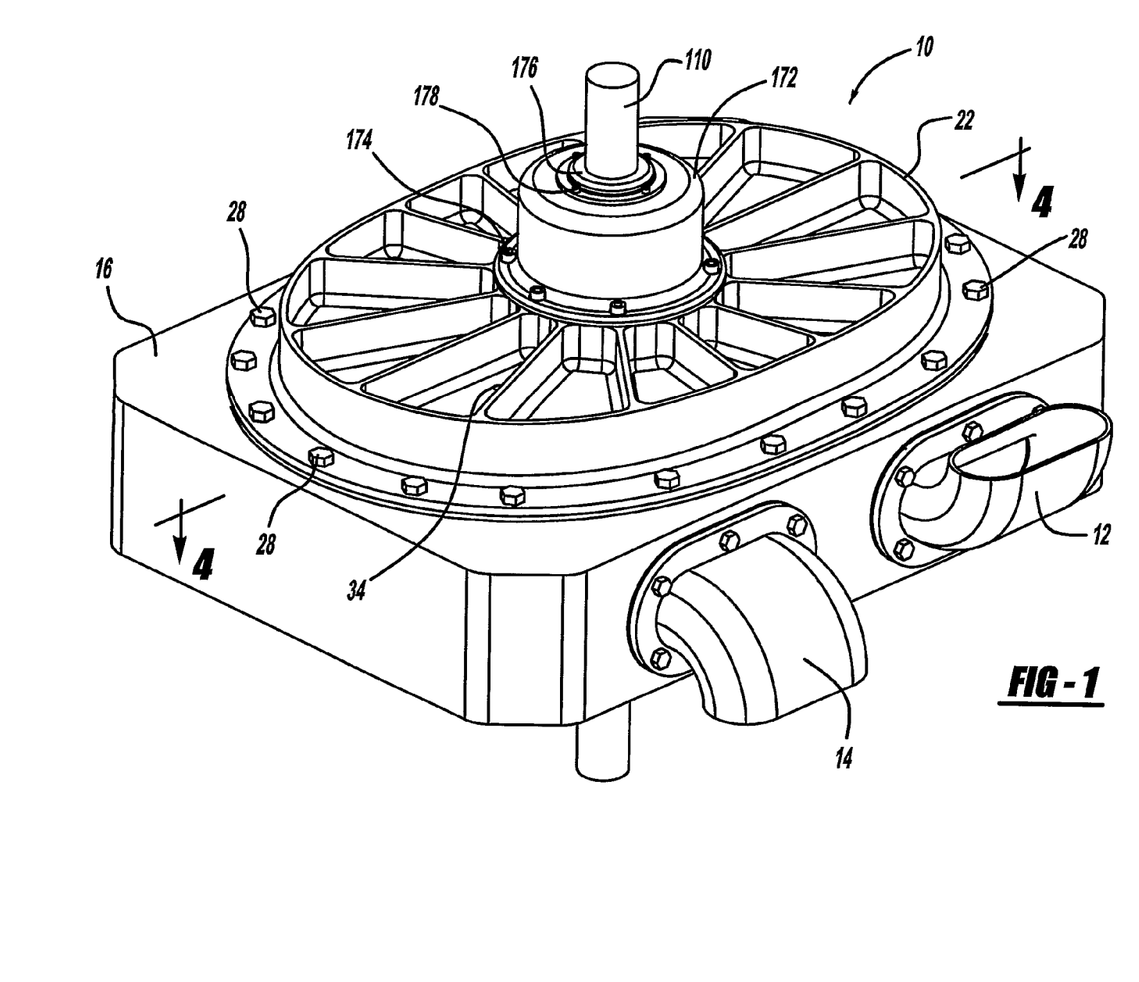
FIG. 1 is a perspective view of an internal combustion engine, according to the present invention.

Referring to FIG. 1, an internal combustion engine according to the present invention is generally shown at 10. The engine 10 includes an inlet or an inlet port 12 and an outlet or an exhaust port 14 mounted on a block 16. Referring to the Figures generally, located inside the block 16 is a rotor 18 having a series of slots 20 located circumferentially around the rotor 18. Connected to the block 16 is a first cover plate 22 and a second cover plate 24; the first cover plate 22 is the same as the second cover plate 24 and will be described together. The cover plates 22, 24 have a first set apertures 26 which are used for receiving fasteners 28 which are then inserted into corresponding apertures 30 in the block 16, thereby attaching the cover plates 22, 24 to the block 16. The cover plates 22, 24 also have a second set of apertures 32 for receiving additional fasteners 34 which are then inserted into corresponding apertures 36 in a dual-faced roller cam, which in this embodiment is a roller cam 38. Each cover plate 22, 24 is connected to a roller cam 38, the roller cams 38 are located on opposite sides of the rotor 18 as shown in the Figures. Each cover plate 22, 24 contains a groove 40 which is of similar shape as the roller cam 38 for aiding in maintaining the position of the roller cam 38 relative to the rotor 18.

Figure 2:
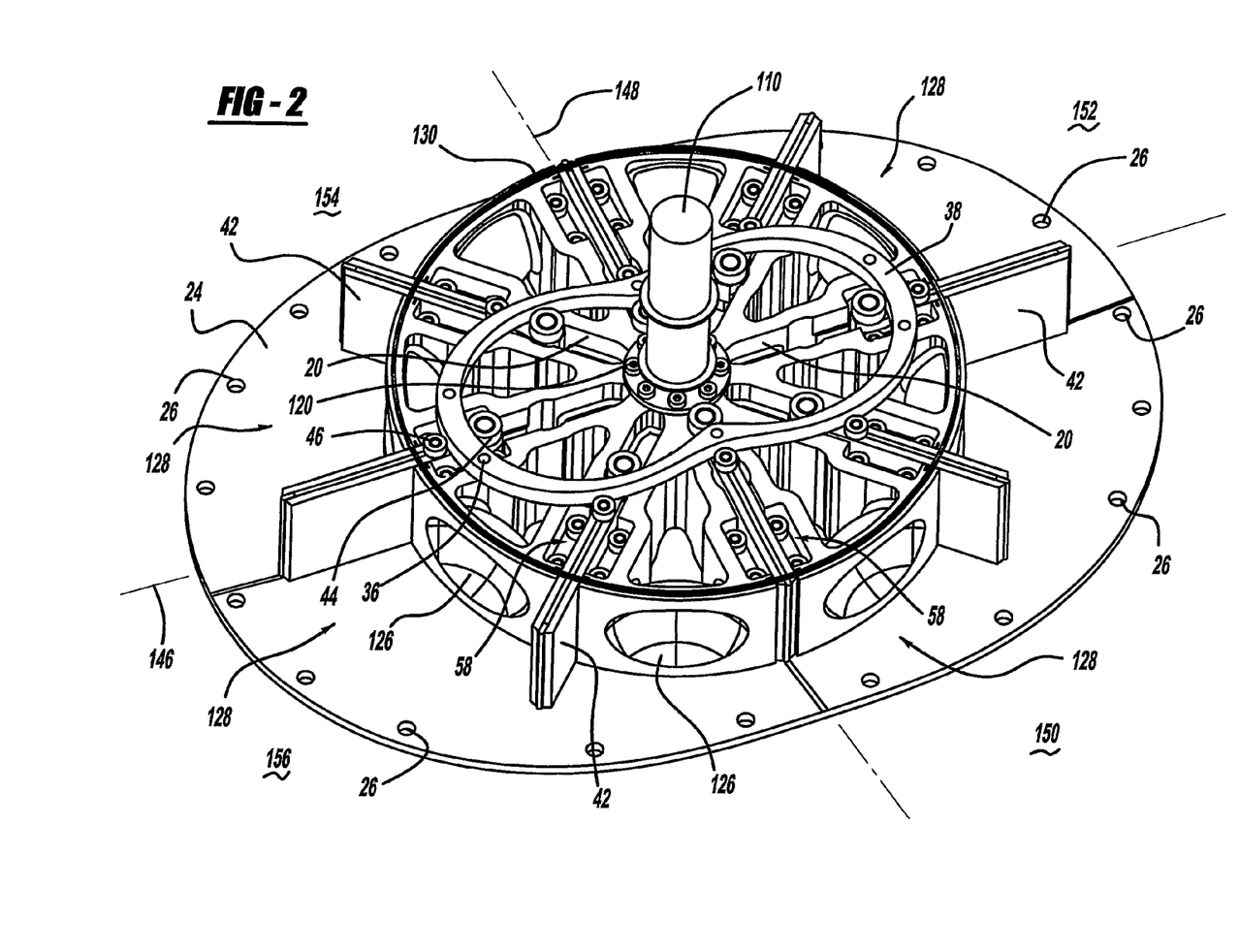
FIG. 2 is a perspective view of an internal combustion engine with the first cover plate, the second cover plate, one of the side inserts, and block removed, according to the present invention.
Figure 3:
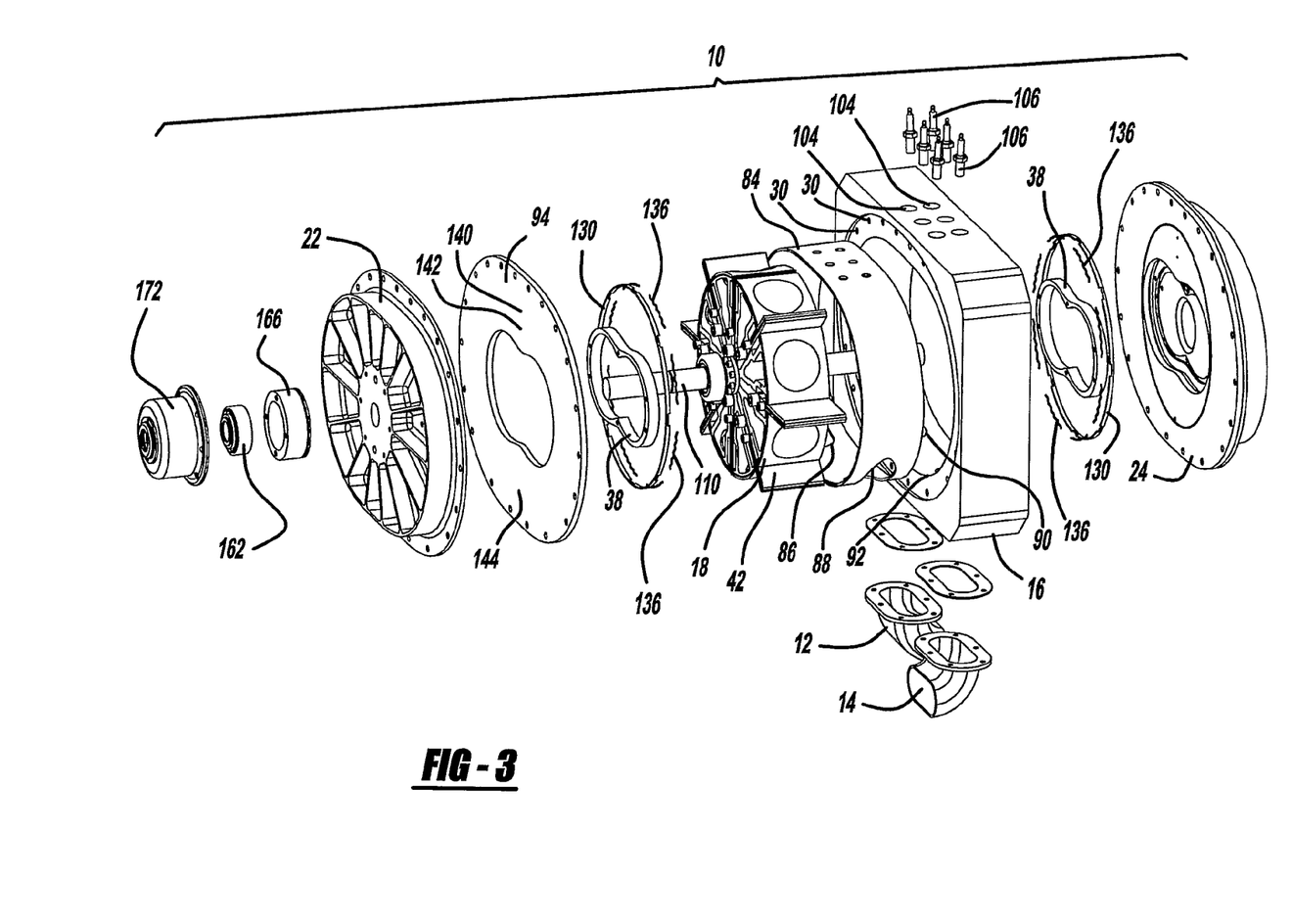
FIG. 3 is an exploded view of an internal combustion engine, according to the present invention.
Figure 5:
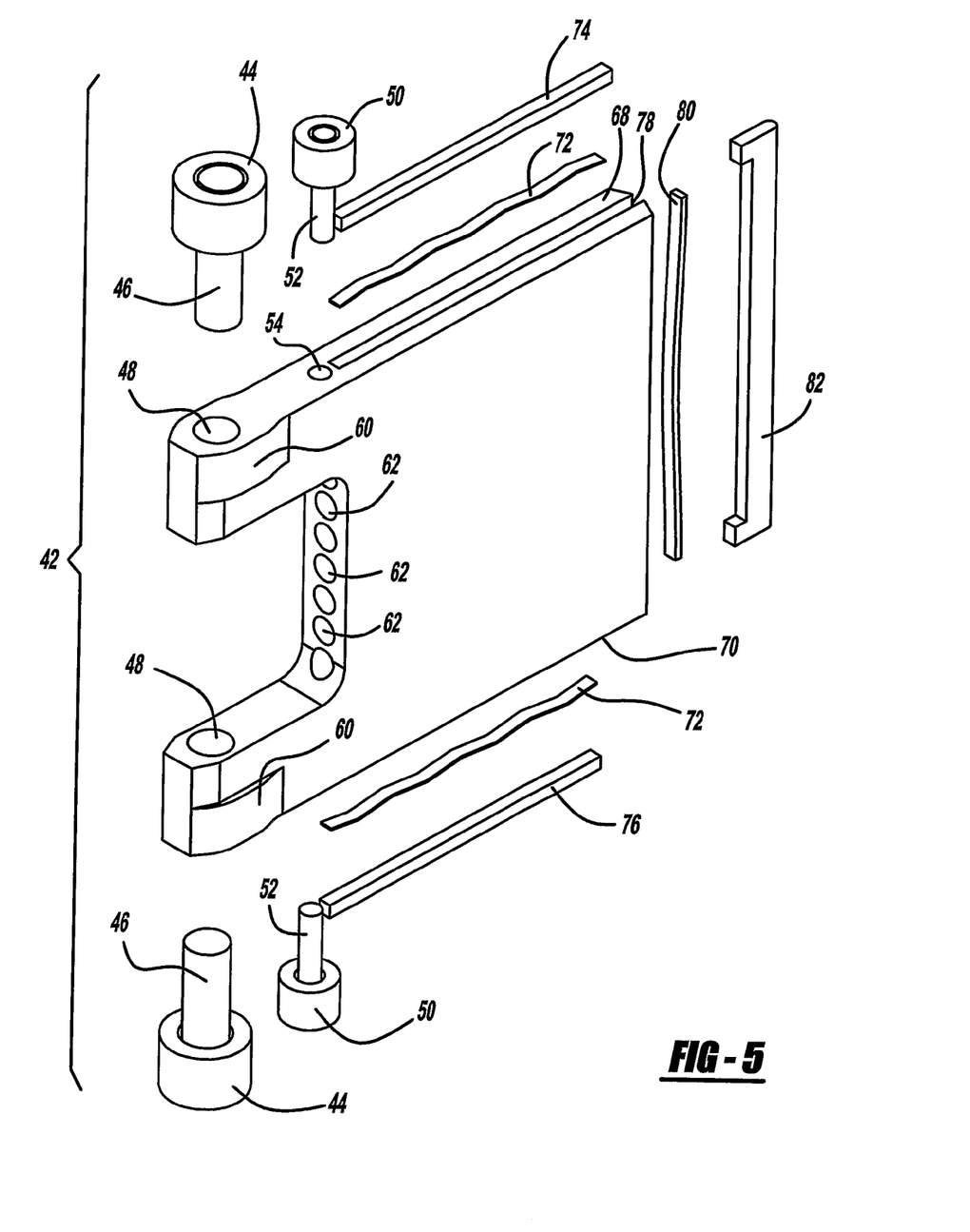
FIG. 5 is an exploded view of a vane used in an internal combustion engine, according to the present invention.
Figure 6:
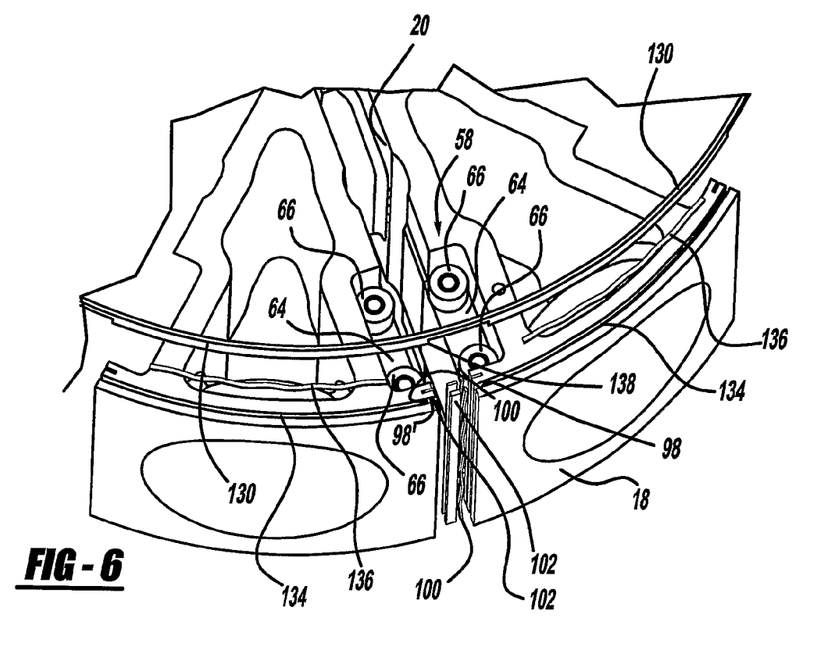
FIG. 6 is an enlarged perspective view of a bearing lock and a seal used in an internal combustion engine, according to the present invention.
Figure 7:
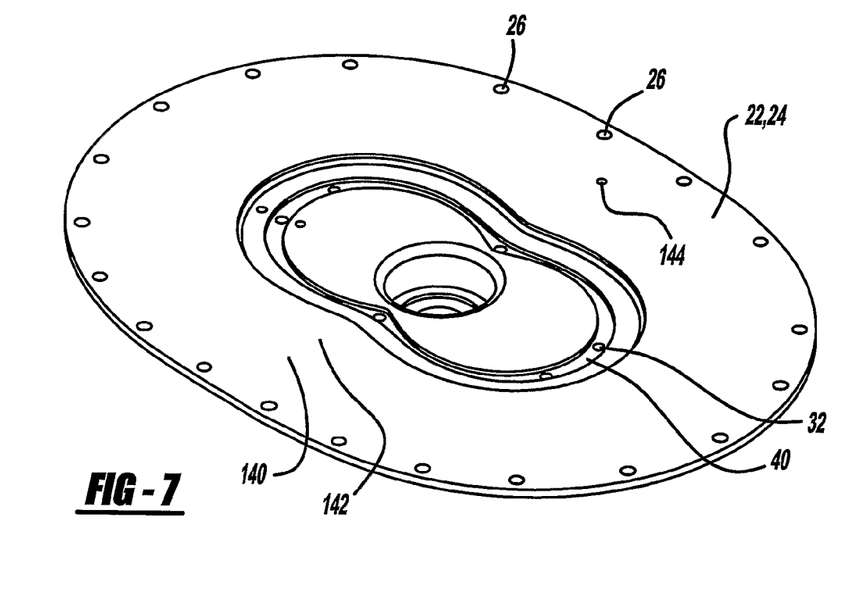
FIG. 7 is a perspective view of a cover housing used in an internal combustion engine, according to the present invention.

Rollably disposed in each of the slots 20 are corresponding vanes 42. Each vane 42 is similar, and the description of one vane 42 applies to the remaining vanes 42. An exploded view of one of the vanes 42 is shown in FIG. 5. Each vane 42 has a first cam roller or large cam roller 44 rotatably mounted on a large stub shaft 46, where the large stub shaft 46 is received by a large aperture 48, and a second cam roller or small cam roller 50 mounted on a small stub shaft 52, where the small stub shaft 52 is received by a small aperture 54. The large stub shaft 46 and the small stub shaft 52 are received in the large and small apertures 48, 54 respectively in a conventional manner such as a threaded or press fit. The large cam roller 44 and the small cam roller 50 are on opposite sides of the roller cam 38 and roll along the roller cam 38 as the rotor 18 rotates, changing the position of the vanes 42 relative to the rotor 18. The position of each vane 42 relative to each slot 20 as the rotor rotates is defined by the shape of the roller cam 38. As each vane 42 moves relative to the rotor 18, a bearing lock, shown generally at 58 in FIGS. 2 and 6, is used to prevent friction between the vanes 42 and each slot 20. The portion 60 of the vanes 42 surrounding large apertures 48 is of increased thickness for handling the increased loads applied to the vane 42 by the large stub shafts 46.

Each vane 42 also has a series of openings 62, in which the material forming the vane 42 has been removed for the purpose of reducing the weight of the vane 42, increasing efficiency. Each bearing lock 58 has a base portion 64 formed as part of the rotor 18. Mounted on the base portion 64 are a set of bearing lock rollers 66 which contact the surface of the vane 42 and allow each of the vanes 42 to roll into and out of the slots 20 under reduced friction. The vanes 42 are generally rectangular in shape, and also include a first side groove 68 and a second side groove 70, tensions springs which are preferably wave springs 72, and first side seal 74 and second side seal 76. The vanes 42 also have an outer groove 78 which receives an outer wave spring 80 and an outer seal 82. The outer wave spring 80 used with the outer seal 82 presses the outer seal 82 against a combustion wall, which in this embodiment the combustion wall is a cast iron insert 84. The cast iron insert 84 is positioned inside the block 16. The cast iron insert 84 includes an inlet aperture 86 and an outlet aperture 88 which are aligned with an inlet opening 90 and an outlet opening 92 in the block 16. Two side combustion walls 94, 96 which can also be cast iron inserts, are located in the block 16 and are used with the cast iron insert 84 to surround the rotor 18 and the vanes 42, the function of which will be described later. The wave springs 68 press the first side seal 74 and second side seal 76 against the side inserts 94, 96.

Each slot 20 also has a set of slot recesses 98 used for receiving corresponding slot wave springs 100 and slot seals 102; the slot seals 102 are pressed against, and are in sliding contact with, each side of the vane 42. The block 16 also has ports 104 used for receiving an igniter, or spark plugs 106, and oil collector lines 108 for receiving lubricating oil. At least one, but preferably a plurality of ports 104 can be used in the block 16 for receiving at least one or a corresponding plurality of spark plugs 106, the purpose of which to ignite an air-fuel mixture at different points during the rotation of the rotor 18, as the speed of the rotation of the rotor 18 changes.

The rotor 18 is mounted on an output shaft 110, the output shaft 110 has bearings 112 which supports the output shaft 110, and allows the output shaft 110, along with the rotor 18, to rotate relative to the block 16, the cast iron insert 84, and the side cast iron inserts 94, 96. The output shaft 110 is connected to the rotor 18 through the use of a spline connection 118, and a set of fasteners 120 inserted into a set of apertures (not shown) on the output shaft 110 and another set of apertures (also not shown) on the rotor 18. The output shaft 110 can be connected to a transmission, or any other device requiring rotational power. The rotor 18 also includes combustion chambers 126 which are located in between each of the vanes 42. The area between the vanes 42, along with the combustion chambers 126 form a variable chamber or cavity, generally shown at 128, which varies in size and is used for combusting the air and fuel mixture, which will be described later. The area in the block 16 in which the rotor 18 is located is also sealed by a seal 130 on each side of the rotor 18, and each seal 130 partially rests in a rotor groove 134. Each seal 130 is supported in the rotor groove 134 by a rotor wave spring 136, the rotor wave spring 136 presses each seal 130 against the side cast iron inserts 94, 96. Each seal 130 also has a set of notches 138, which receive, and are in frictional contact with, the first side seals 74 and the second side seals 76, respectively, and allow the vanes 42 to roll into and out of the slots 20, while still providing a sealing effect. The first side seals 74, second side seals 76, seals 130, and the slot seals 102 prevent oil from entering the cavities 128. Lubrication is provided by feeding oil, or some other type of lubricant, through oil feed holes 140, 142, which is then swept about the rotor 18 by the vanes 42, and exits through an oil return hole 144. The notches 138 receiving the first side seals 74 and the second side seals 76 also serve the function of maintaining the position of the seal 130 relative to the rotor 18; each seal 130 therefore rotates with the rotor 18, and relative to the side cast iron inserts 94, 96, respectively.

The engine 10 also has a first axis 146 and a second axis 148. Each axis 146, 148 acts to divide the engine 10 into four quadrants, a first quadrant 150, a second quadrant 152, a third quadrant 154, and a fourth (quadrant 156. Each quadrant performs a different part of the cycle with respect to the engine 10 operation. The first quadrant 150 is the intake cycle, the second quadrant 152 is the compression cycle, the third quadrant 154 is the power cycle, and the fourth quadrant 156 is the exhaust cycle. Each quadrant 150, 152, 154, 156 comprises ninety degrees of the rotation of the rotor 18.

The first side seal 74, second side seal 76, outer seal 82, slot seals 102, and seal 130 provide a sealing effect such that no air or fuel that is to be combusted will contact the sides of the rotor 18 beyond the seal 130, or become mixed with air or fuel in adjacent cavities 128, essentially preventing "blow by."

Figure 4:
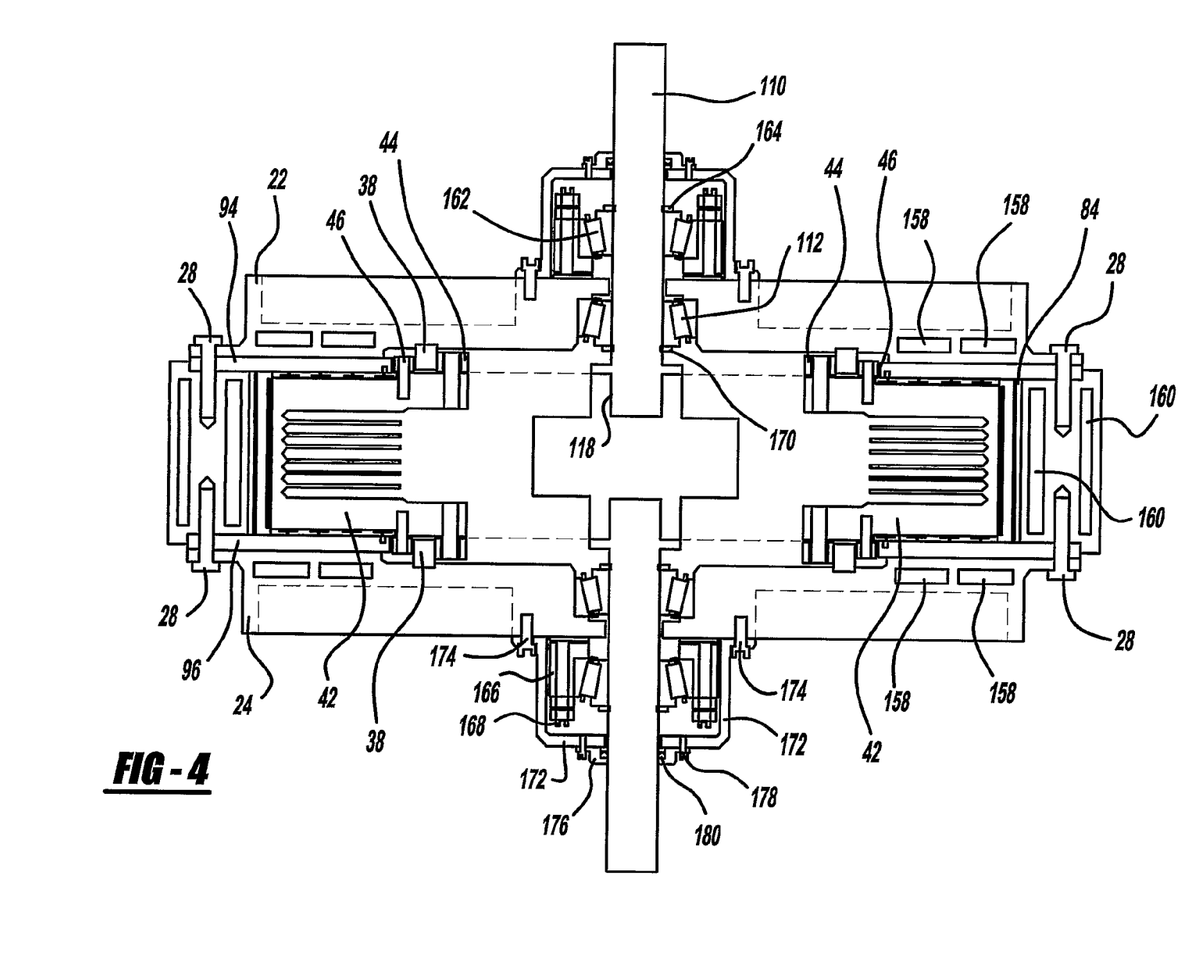
FIG. 4 is a sectional side view taken along line 4-4 in FIG. 1, according to the present invention.

Referring now to FIG. 4, the first and second cover plates 22, 24 also include a water jacket 158 which works with a water jacket 160 in the block to provide cooling to the engine 10. On the outside of the first and second cover plates 22, 24, there is an outer bearing 162 held in position on the output shaft 110 by a snap ring 164, and a bearing support 166. The bearing support 166 is connected to the first and second cover plates 22, 24 respectively by fasteners 168. The bearing 112 is also held between a snap ring 170, and the first and second cover plates 22, 24. The bearing 112, the outer bearing 162, the snap rings 164, 170, along with the bearing supports 166 act to keep the output shaft 110 and rotor 18 from moving axially relative to the first and second cover plates 22, 24 and the block 16 so as to maintain the proper positioning of the first side seal 74 and the second side seal 76 relative to the side cast iron inserts 94, 96 respectively, and the outer seal 82 relative to, and in constant sliding contact with, the cast iron insert 84. The outer bearing 162 is covered by a bearing cover 172 which is fastened to the first and second cover plates 22, 24 by a set of fasteners 174. The bearing cover 172 also has an outer cap 176 fastened to the bearing cover 172 with another set of fasteners 178. Inside the outer cap 176 is a seal 180 for preventing oil which lubricates the bearings 112, and the outer bearings 162, from leaking.

In operation, the rotor 18, and therefore all of the vanes 42 and the various components associated therewith, rotates such that the vanes 42 are rotating in a direction moving from the exhaust port 14 toward the inlet port 12. Note that the area inside the block 16 in which the rotor 18 is positioned, the cast iron insert 84, and the side cast iron inserts 94, 96 are approximately elliptical in shape. The area inside the block 16 and the cast iron insert 84 have a portion which is substantially similar in diameter to the rotor 18, and a portion that is larger in diameter compared to the rotor 18. The rotor 18 is arranged in the cast iron insert 84 such that as the rotor 18 rotates, the vanes 42 will alternate from an almost completely extended position where the vane 42 is substantially out of the slot 20, to an almost completely retracted position where the vane 42 will be substantially retracted into the slot 20. Each vane 42 will extend out of and retract into the slot 20 twice during one rotation of the rotor 18. The first side seal 74 and second side seal 76 remain in constant contact with the side cast iron inserts 94, 96, respectively, and the outer seal 82 remains in constant contact with the cast iron insert 84.

As the vanes 42 move across the inlet opening 86, air, or an air/fuel mixture, is drawn into the space between the vanes 42. Fuel can be injected into the inlet port 12 along with the air, or fuel can be injected by replacing one or more of the spark plugs 106 with a fuel injector in the ports 104. While the combustion chamber 126 is a fixed volume, each cavity 128 expands as the vanes 42 move through the first quadrant 150 because each vane 42 moves from a position of being retracted into a respective slot 20 to an extended position out of a respective slot 20. This creates a vacuum effect, causing the air or air/fuel mixture to be drawn into the cavity 128.

Once the vanes 42 enter the second quadrant 152, the compression cycle is performed. In the second quadrant 152, the volume of the cavity 128 becomes reduced, compressing the air in between the vanes 42 as the rotor 18 continues to rotate. The compression is a result of the cavity 128 between the vanes 42 being reduced in size as the rotor 18 rotates through the second quadrant 152. During this part of the rotation, each vane 42 moves from an extended position to a retracted position.

After the air or air/fuel mixture is compressed, the vanes 42 will rotate into the third quadrant 156. As each vane 42 enters the third quadrant 156, the spark plugs 106 in the ports 104 will ignite the fuel in the cavity 128, causing combustion in a similar manner to a conventional internal combustion engine. As can be seen in FIG. 2, as each vane 42 moves through the third quadrant 156, the vane 42 will roll out of its respective slot 20. This results in each vane 42 having a greater surface area exposed to combustion as compared to the following vane 42. The greater surface area will result in a net unidirectional rotation of the rotor 18. It should be noted that the larger the distance between the center of the output shaft 110 to edge of the vane 42 where the outer seal 82 is located provides additional leverage for greater torque at low engine speeds. As previously mentioned, additional spark plugs 106 can be incorporated into the engine 10. The reason for incorporating additional spark plugs 106 results from the fact the fuel burns (or combusts) at the same rate, regardless of how fast the rotor 18 is spinning. As the rotor 18 rotates faster and faster, the fuel must be ignited earlier during the rotation of the rotor 18 to ensure that the combustion takes place in the third quadrant 154. The position of the spark plugs 106 added to the engine 10 will be dependent upon the maximum operating speed of the rotor 18, which can vary from one application to the next. Additional spark plugs allow for redundancy of ignition as may be desirable in certain applications, such as in aircraft, or the like.

As each vane 42 enters the fourth quadrant 158, the each vane 42 will change from an extended position where the vane 42 is extended out of the slot 20, to a retracted position, where the vane 42 is retracted into the slot 20. As this occurs, size of the cavity 128 will decrease, causing the combusted gases to be swept through the outlet aperture 88, the outlet opening 92, and the exhaust port 14. Once the vanes 42 pass through the fourth quadrant 158, the vanes 42 will re-enter the first quadrant 152 and begin the intake cycle again.

Figure 8:
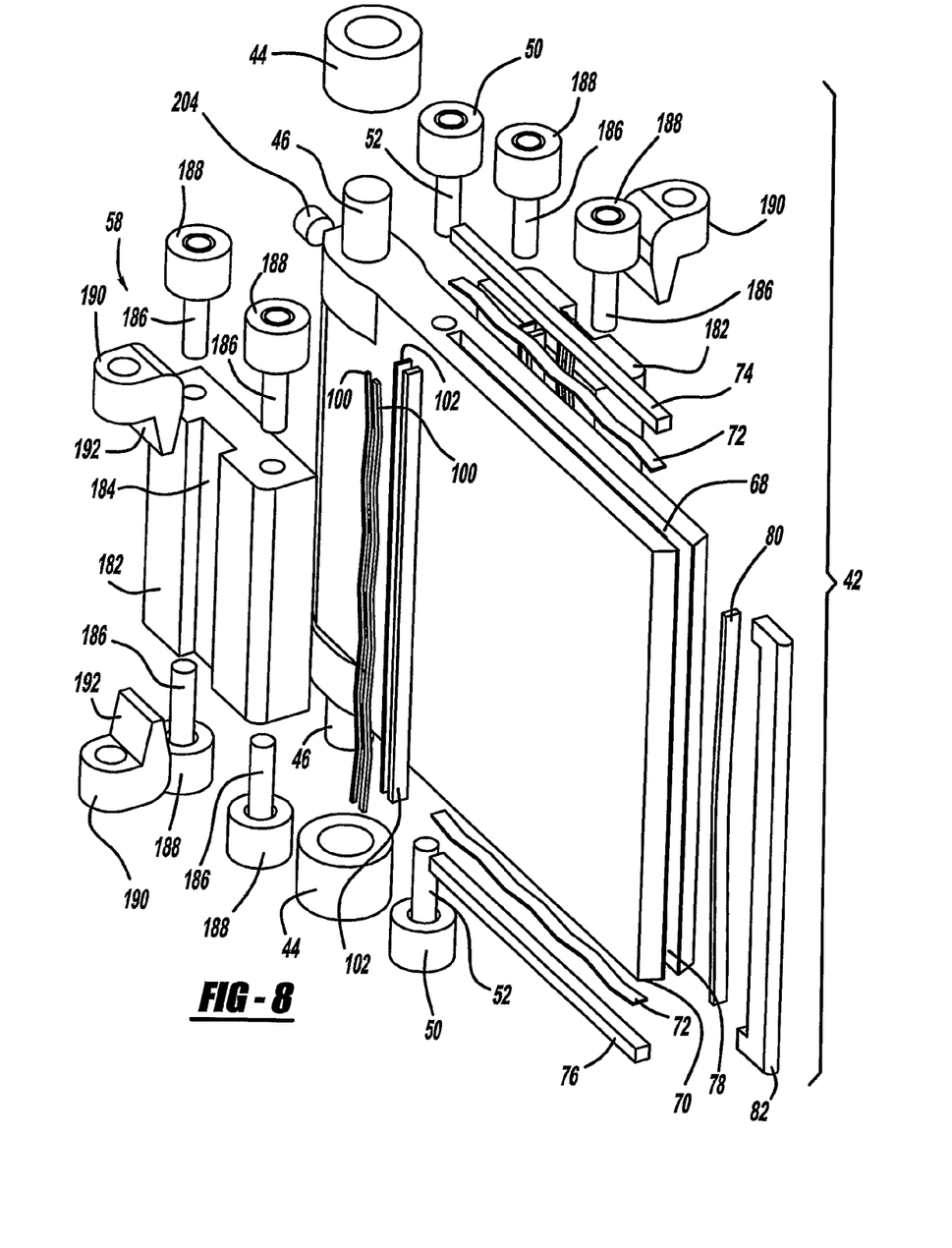
FIG. 8 is a first exploded view of an alternate embodiment of a vane used in an internal combustion engine, according to the present invention.
Figure 9:
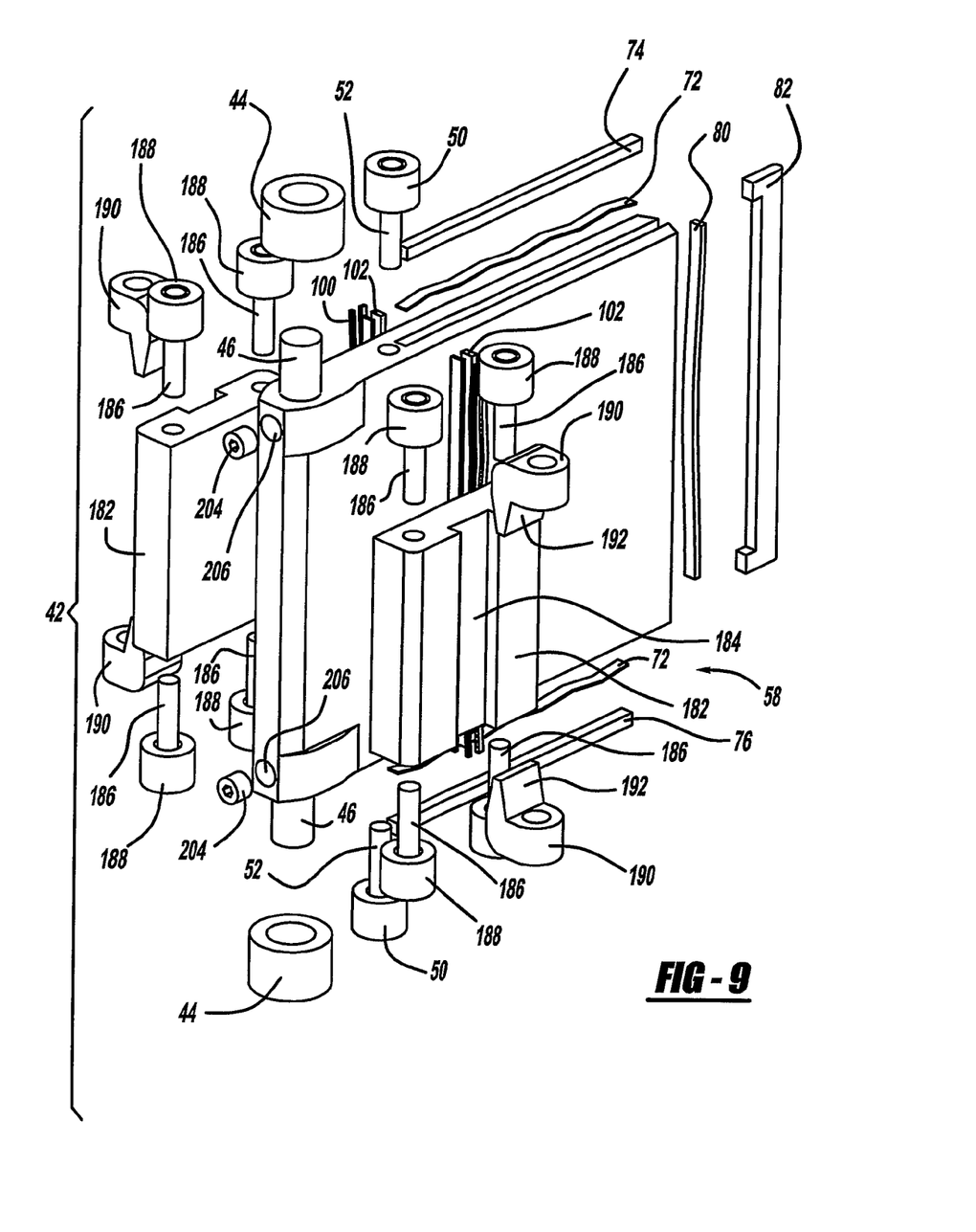
FIG. 9 is a second exploded view of an alternate embodiment of a vane used in an internal combustion engine, according to the present invention.
Figure 12:
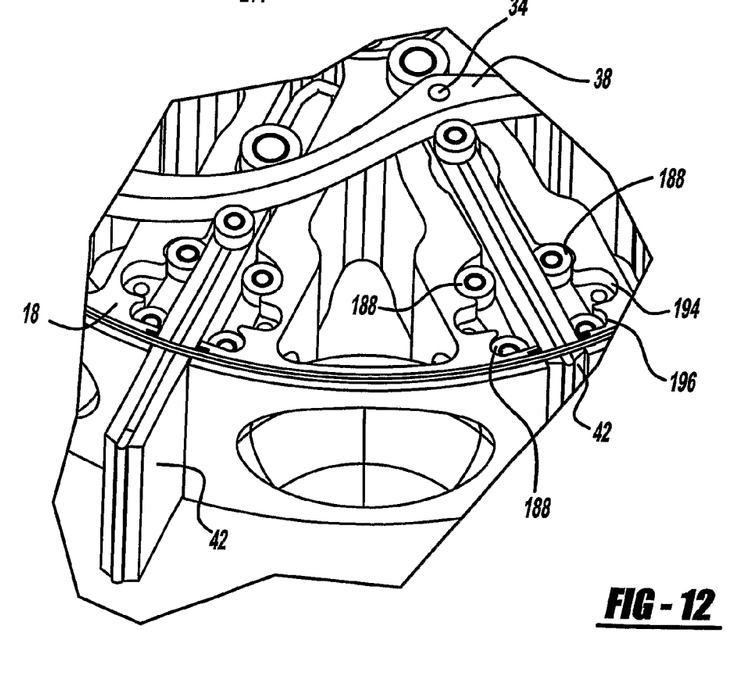
FIG. 12 is an enlarged perspective view of an alternate embodiment of a bearing lock, according to the present invention.
Figure 13:
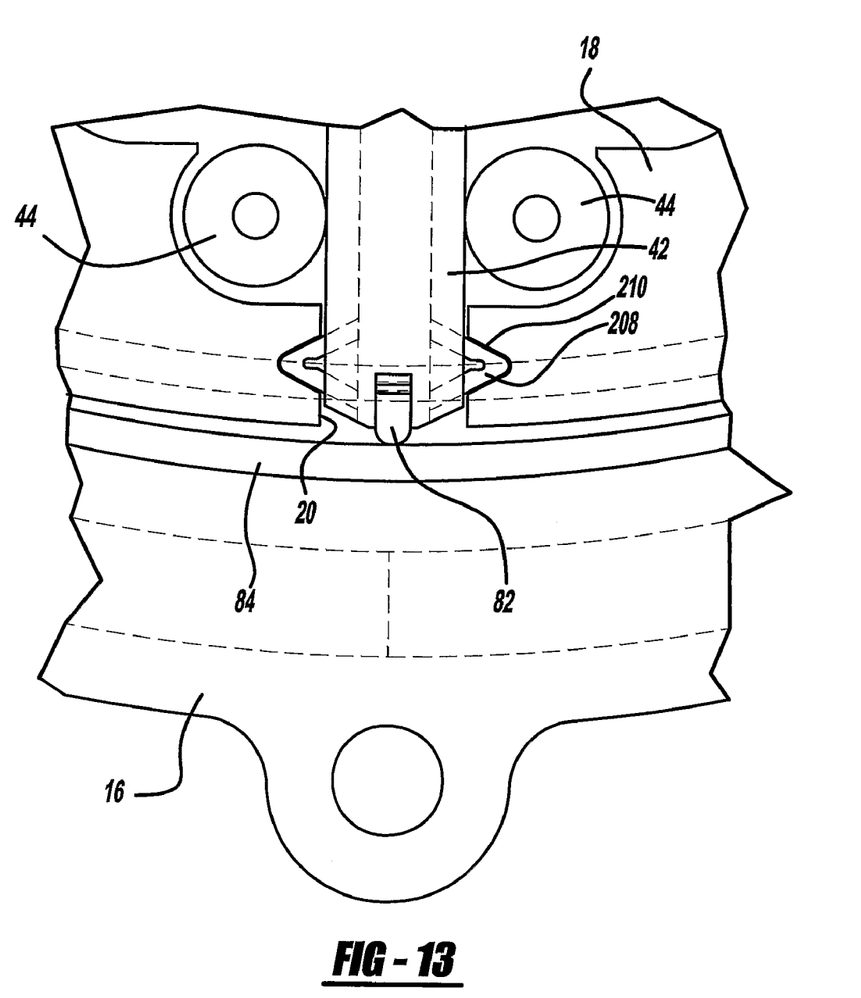
FIG. 13 is a greatly enlarged perspective view of an alternate embodiment of a vane used in an internal combustion engine, according to the present invention.

An alternate embodiment of the vanes 42 and bearing lock 58 is shown in FIGS. 8, 9, and 12, with like numbers referring to like elements. In this embodiment, the large stub shafts 46 are mounted on the vane 42 itself. Each bearing lock 58 has a base portion 182 having a groove 184. The base portion 182 also has shafts 186 for supporting rollers 188 which contact the vanes 42 as the vanes 42 roll in the slots 20. Each bearing lock 58 also includes a set of locking members 190 having a tab 192 which is received by the groove 184. In this embodiment, the slots 20 of the rotor 18 are different, and have a first set of recesses 194 which partially receive the locking members 190, and a second set of recesses 196 which receive the rollers 188. The fit between the locking members 190 and the first set of recesses 194 allows the locking members 190 to apply a force to the groove 184 and therefore the base portion 182 to provide ability for pre-loading. This force is transferred through the shafts 186 and the rollers 188. The force applied from the rollers 188 to each side of the vane 42 allows the vane 42 to roll into and out of the slot 20 as the rotor 18 rotates. The vanes 42 also have set screws 204 received in a set of holes 206 in the vane 42 which prevent "play" during rotation of the rotor 18. In FIG. 12, there are seals 208 which have a V-shaped cross-section and are received in a V-shaped recess 210 in the rotor 18. Note that in this embodiment, the surface of the vane 42 is not uniform, and the shape of each seal 208 matches the surface of the vane 42, thereby allowing the seal 208 to prevent any debris from entering the slot 20 as the vane 42 rolls into the slot 20. The seal 208 and the corresponding recess 210 are suitable for use with either type of bearing lock 58, and the shape of the seal 208 can be changed to match the surface of any type of particular vane 42. In FIGS. 8 and 9, there are two slot wave spring 100 and two slot seals 102 used together for an improved sealing effect. This double sealing configuration can be used with either embodiment of the vanes 42.

Figure 10:
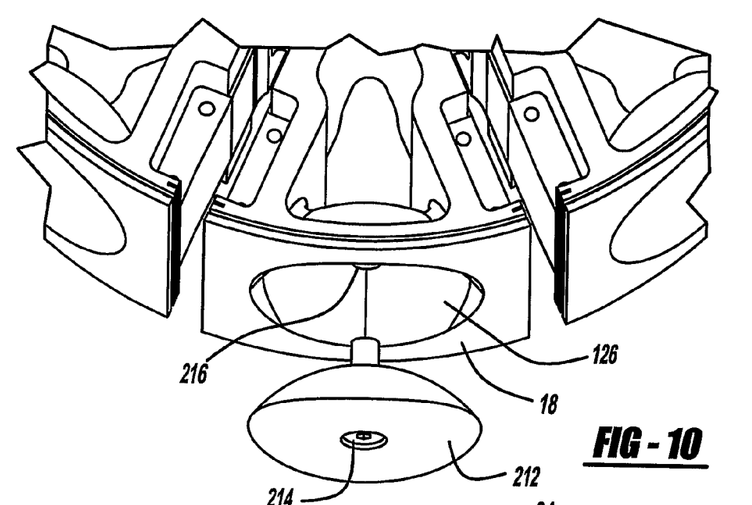
FIG. 10 is a perspective view of a plug used in a combustion chamber, used in an internal combustion engine, according to the present invention.
Figure 11:
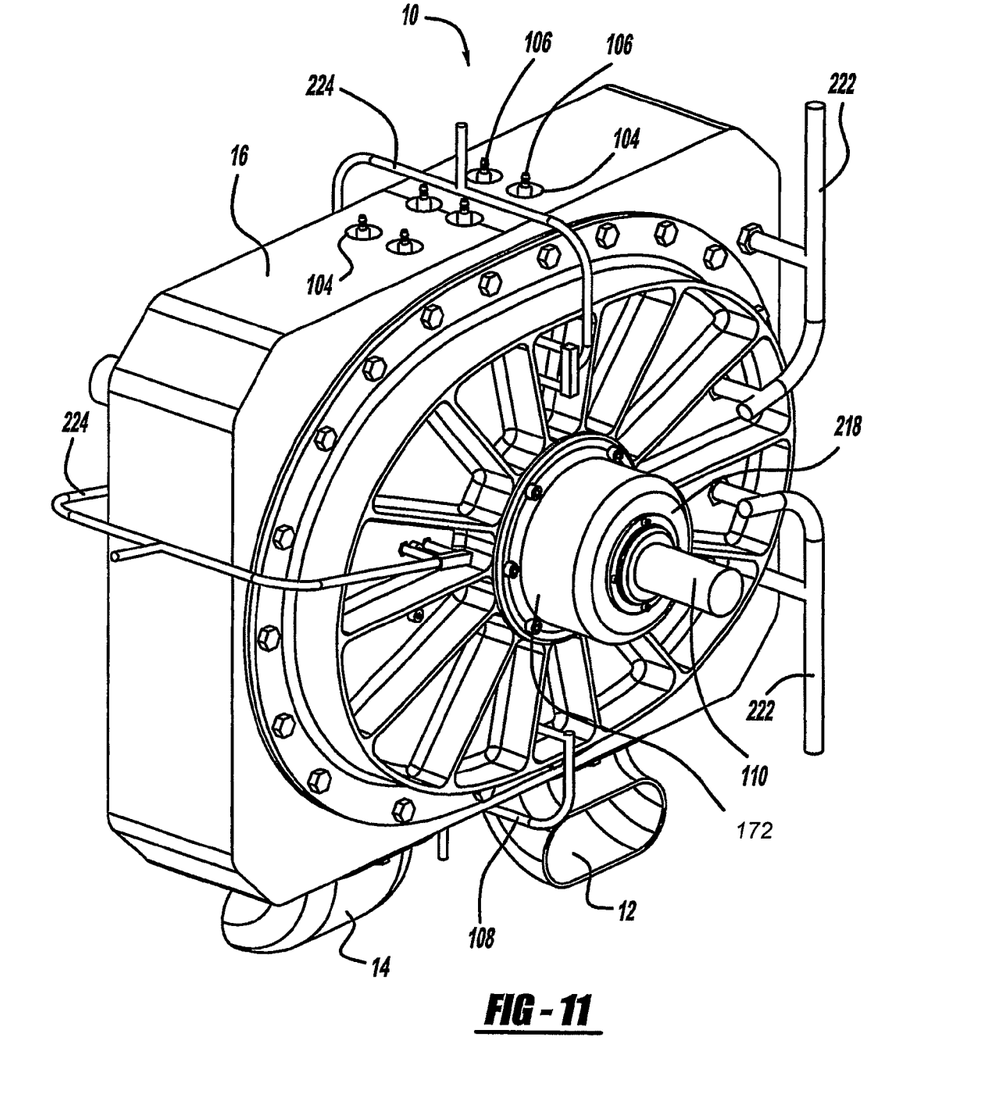
FIG. 11 is a perspective view of an internal combustion engine incorporating a water pump and an oil pump, according to the present invention.

Referring to FIG. 10, the shape of the combustion chambers 126 can be changed to vary the amount of displacement and compression achieved in the engine 10. The amount of space can also be changed by using plugs 212 to reduce the space, and vary compression. The plugs 212 have fasteners 214 which are received by corresponding apertures 216 in the combustion chambers 126. If the engine 10 is operated using diesel fuel, the size of combustion chambers 126 can be changed so as to increase compression to combust the diesel fuel properly, eliminating the need for a spark plug. The engine 10 can also be adapted for use with hydrogen or hydrocarbon fuel. Other advantages of the present invention include reduced friction by extensive use of rollers as opposed to sliding surfaces, and the elimination of a flywheel similar to what is used in traditional internal combustion engines because the mass of the rotor eliminates the need for a flywheel. This engine 10 can also be used as a positive displacement turbine powered by external combustion, steam, or other means of generating high-pressure gases. The use of a crank shaft is eliminated because the output shaft 94 is bolted directly to the rotor 18. Also, the engine 10 provides multiple power impulses per revolution, allowing for the use of fewer spark plugs on the opposite side of the ports 104. The engine 10 is modular and can be combined with other engines in tandem for increasing power. Oiling is supplied to the engine 10 through dry sump technology, which allows the engine to be mounted in any orientation. The design of the engine 10 also allows for air or liquid cooling systems.

The present invention also includes several other advantages. The cover plates can easily be removed thereby allowing the rotor 18, the vanes 42, and the roller cams 38 to easily be replaced, therefore improving serviceability and maintenance. Additionally, the roller cams 38 provide a smooth controlled movement of each of the vanes 42 without having the vanes 42 themselves come in contact with the inserts 84. Only the outer seals 82 on each of the vanes 42, will touch the surface of the cast iron insert 84. The engine 10 is also designed for reducing the surface to volume ratio in each cavity 128, as the cavity 128 moves through the third quadrant 154, which is the quadrant in which combustion takes place, thereby reducing emissions. Although the surface to volume ratio is reduced, the compression ratio is maintained allowing the engine 10 to use conventional fuels. Additionally, the block 16 can be incorporated to hold many spark plugs 106 and injectors for facilitating a direct injection fuel system. The engine 10 can also be used using air flowing into the inlet port 12, or compressed air forced into the inlet port 12 received from a device such as a turbocharger unit. The engine 10 can also be mounted in any position making it suitable for devices such as aircraft. Also, the engine 10 does not require specific tools for assembly, which facilitates ease of manufacture.

Referring to FIG. 12, a water pump and an oil pump could be incorporated into the engine 10 and can be mounted on the output shaft 110, or externally and operate under an independent source of power. The water pump includes a series of pipes 222 for delivering cooling fluid to the water jackets 158, 160, and the oil pump includes a series of fluid conduits 224 for feeding oil to the oil feed holes 140, 142, and receiving oil from the oil return holes 144, which then delivers the oil to the oil collector lines 108.

Figure 14:
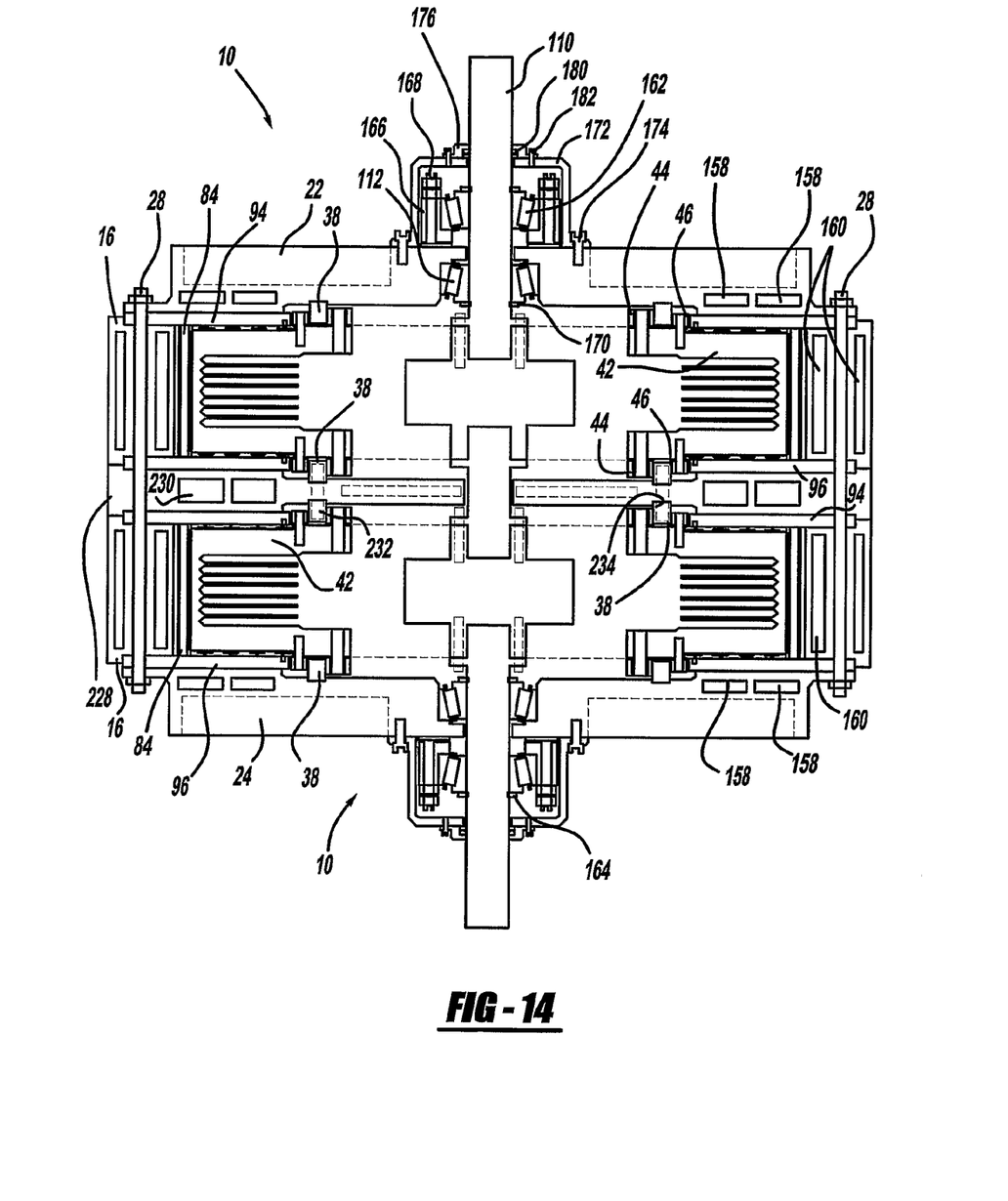
FIG. 14 is a sectional view of an alternate embodiment of an engine incorporating an additional engine, according to the present invention.

A sectional view of an alternate embodiment of the engine 10 is shown in FIG. 14. In this embodiment, the original engine 10 is combined with an additional engine 226 to provide additional power. Here, the first cover plate 22 is connected to the engine 10, and the second cover plate 24 is connected to the additional engine 226. Disposed between the first engines 10 and the additional engine 226 is a "coupler section" 228 which has an enlarged water jacket 230 for providing cooling to both engines 10. The fasteners 28 extend through the blocks 16 of both engines 10, 226. Also, the roller cams 38 in between the engines 10, 226 have fasteners 232 which extend through one of the roller cams 38 in the engine 10 and are received by a threaded portion 234 in the corresponding roller cam 38 in the engine 236. As shown in FIG. 14, the engine 10 and the additional engine 226 are configured such that the third quadrants 154 (where combustion takes place) are one-hundred-eighty degrees apart, such that the firing sequence of the engine 10 is one-hundred-eighty degrees apart from the additional engine 226.

However, it is within the scope of the invention to configure the third quadrant 154 of the engine 10 to be at other angles relative to the third quadrant 154 of the additional engine 226 (i.e. twenty-two and a half degrees, forty five degrees, etc. . . . ) to provide various firing sequences and smoothness of operation. The coupler section 228 can compensate for the various orientations of the additional engine 226 relative to the engine 10 by allowing the roller cam 38 in the engine 10 to be at various angles relative to the roller cam 38 in the additional engine 226.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary engine comprising:
    a rotor having a circumferential surface with a plurality of combustion chambers formed therein and having a plurality of vane-receiving slots distributed around said circumferential surface and located between said combustion chambers;
    a central shaft on which said rotor is mounted;
    a plurality of vanes each mounted in a respective one of the plurality of vane-receiving slots and movable in a radial direction into and out of the respective one of the plurality of said vane-receiving slots as the rotor rotates;
    a stator including an engine block forming a rotor chamber in which said rotor is rotatbly mounted, said stator, rotor and vanes in combination forming chambers which vary in size as the rotor rotates, said stator having an inlet for a fuel and air mixture, and an outlet for discharge of exhaust gases;
    a cam arrangement for controlling radial movement of said vanes as the engine operates and said rotor rotates; and
    a plurality of plugs each insertable into a respective one of said combustion chambers thereby reducing the size of the combustion chamber, each plug being adapted for attachment to the rotor in its combustion chamber, whereby insertion of said plugs into the combustion chambers and attachment of said plugs to the rotor increases compression of a fuel and air mixture in each variable chamber prior to combustion during engine operation.

2. The rotary engine according to claim 1, wherein said plugs are attached to the rotor in their respective combustion chambers by fasteners received in apertures formed in said rotor.

3. The rotary engine according to claim 1, wherein said stator includes first and second cover plates detachably connected to opposite sides of said block and covering opposite sides of said rotor.

4. The rotary engine according to claim 3, wherein said cam arrangement includes first and second roller cams each detachably connected to an inner side of a respective one of the cover plates and cam rollers rotatably mounted on opposite side edges of each vane and engaging cam tracks formed by said roller cams.

5. The rotary engine according to claim 4, wherein said cam rollers include two first cam rollers and two second cam rollers mounted on said opposite side edges of each vane with one of said first cam rollers and one of said second cam rollers mounted on each of said opposite side edges, each first cam roller of each vane being in rolling contact with a respective one of said first and second roller cams and each second cam roller of each vane being in rolling contact with a respective one of said first and second roller cams.

6. The rotary engine according to claim 1, further comprising a plurality of bearing roller sets, each bearing roller set comprising bearing rollers in rolling contact with and supporting a respective one of said vanes when the vane moves in the respective one of the plurality of said vane-receiving slots and each bearing roller set being mounted on the rotor in the respective one of the plurality of vane-receiving slots so that the bearing rollers of the set roll along opposite side surfaces of their vane as the vane moves in its slot.

7. A rotary engine, comprising:
    a rotor having a circumferential surface with a plurality of combustion chambers formed therein and having a plurality of vane-receiving slots distributed around said circumferential surface and located between respective adjacent pairs of said combustion chambers;
    a plurality of vanes each mounted in a respective one of the plurality of said vane-receiving slots and moveable in a radial direction into and out of the respective one of the plurality of said vane-receiving slots as the rotor rotates;
    a central shaft on which said rotor is mounted;
    an engine block forming a rotor chamber in which said rotor is rotatably mounted, said chamber being defined by an internal surface of the block that surrounds said circumferential surface of said rotor, said block having opposite first and second sides extending transversely relative to said rotor shaft, an inlet for a fuel and air mixture, and an outlet for discharge of exhaust gases;
    a first side cover arrangement connected to said first side of the block and covering said rotor on one side thereof;
    a second side cover arrangement connected to said second side of the block and covering said rotor on a second side thereof opposite said one side of the rotor;
    first and second roller cams each arranged on an inner side of a respective one of the side cover arrangements;
    an ignition source for combusting the fuel and air mixture to produce said exhaust gases, said ignition source being mounted in the engine; and
    cam rollers rotatably mounted on opposite side edges of each vane in order to control radial movement of their respective vane by their engagement with said first and second roller cams, said cam rollers including two first cam rollers and two second cam rollers mounted on one said opposite side edges of each vane with one of said first cam rollers and one of said second cam rollers mounted on each of said opposite side edges, each first cam roller of each vane being in rolling contact with a respective one of said first and second roller cams and each second cam roller of each vane being in rolling contact with a respective one of said first and second roller cams, wherein when said rotor rotates, said first and second roller cams in co-operation with said cam rollers move said vanes respectively in the plurality of said vane-receiving slots such that said vanes consecutively move between and extended position and a retracted position respectively relative to the plurality of said vane-receiving slots with an outer end of each vane being in sealing proximity with said internal surface of the block.

8. The rotary engine according to claim 7, further comprising additional rollers mounted in said rotor on opposite sides of each of the plurality of vane-receiving slots for rollably supporting the vanes, said additional rollers being mounted so as to engage opposite sides of their respective vane during operation of said engine.

9. The rotary engine according to claim 8, wherein each roller cam provides first and second roller tracks extending around a perimeter of the roller cam, said first cam rollers of each vane rollably engaging the first roller track and the second cam rollers rollably engaging the second roller track.

10. The rotary engine according to claim 9, wherein each roller cam is detachably connected to the inner side of its respective side cover arrangement.

11. The rotary engine according to claim 8, wherein the inner side of each side cover arrangement is formed with a centrally located recess shaped to receive and hold a side of the roller cam connected to the respective side cover arrangement.

12. The rotary engine according to claim 8, wherein each vane has first and second side grooves in said opposite side edges of the vane and an outer groove extending across an outer end of the vane, seal springs are arranged in said side and outer grooves, and vane seals are partially received in said side and outer grooves and are biased outwardly from these grooves by said seal springs.

13. The rotary engine according to claim 8, wherein said rotor is formed with seal slots on opposite sides of each of the plurality of vane-receiving slots and mounted in each seal slot is an elongate wave spring and an elongate slot seal biased by its respective wave spring into a sealing engagement with an adjacent side of its respective vane.

14. The rotary engine according to claim 7, wherein each roller cam is detachably connected to the inner side of its respective side cover arrangement.

15. The rotary engine according to claim 7, wherein said rotor, said vanes, and said block in combination form cavities which vary in size as the rotor rotates, and said ignition source is received by said block.

16. The rotary engine according to claim 7, wherein said engine block includes a first iron insert extending around the rotor chamber and forming said internal surface of the block and at least one of said side cover arrangements includes a second insert forming a side combustion wall adjacent to said rotor and in sliding contact with said plurality of vanes.

17. A rotary engine comprising:
a rotor having a plurality of combustion chambers formed therein and distributed around a circumferential surface of the rotor and a plurality of vane-receiving slots arranged between said combustion chambers;
a central shaft on which said rotor is mounted;
an engine block surrounding and receiving said rotor, a plurality of cavities being formed between said vanes and between said rotor and the engine block, said block having an internal wall surrounding said rotor, an inlet for a fuel and air mixture, and an outlet for discharge of exhaust gases;
first and second cover plate arrangements connected to opposite sides of said block so as to cover opposite sides of said rotor, each cover plate arrangement including an internal side wall;
a plurality of vanes each mounted in a respective one of the plurality of vane-receiving slots and adapted to move in a radial direction into and out of the respective one of the plurality of said vane-receiving slots as the rotor rotates, said vanes slidably contacting said internal wall of the block and the internal side walls;
an ignition source for combusting the fuel and air mixture to produce said exhaust gases, said ignition source being mounted in the engine;
first and second roller cams arranged respectively on said first and second cover plate arrangements and operably associated with said plurality of vanes so that, when said rotor rotates, said first and second roller cams engage cam rollers mounted on said vanes in order to move said vanes respectively in the plurality of said vane-receiving slots such that the vanes consecutively move from an extended position to a retracted position in their respective slots, said cam rollers including two first cam rollers and two second cam rollers mounted on opposite side edges of each vane with one of said first cam rollers and one of said second cam rollers mounted on each of said opposite side edges, each first cam roller of each vane being in rolling contact with a respective one of said first and second roller cams and each second cam roller of each vane being in rolling contact with a respective one of said first and second roller cams, each roller cam providing first and second roller tracks extending around a perimeter of the roller cam, said first cam rollers of each vane rollably engaging the first roller tracks and the second cam rollers rollably engaging the second roller tracks; and
a plurality of bearing roller sets, each bearing roller set comprising bearing rollers in rolling contact with and supporting a respective one of said vanes when the vane moves in the respective one of the plurality of vane-receiving slots and each bearing set being mounted on the rotor in the one of the plurality of said vane-receiving slots so that the bearing rollers of the set roll along opposite side surfaces of their vane as the vane moves in its slot.

18. The rotary engine according to claim 17, wherein each bearing roller set comprises four bearing rollers with two bearing rollers located adjacent one of said side surfaces of their respective vane and another two bearing rollers located adjacent the other of said side surfaces.

19. The rotary engine according to claim 17, wherein each vane has first and second side grooves in opposite side edges of the vane and an outer groove extending across an outer end of the vane, seal springs are arranged in said side and outer grooves, and vane seals are partially received in said side and outer grooves and are biased outwardly from these grooves by said seal springs so as to contact said internal wall of the block and said internal side walls.

20. The rotary engine according to claim 17, wherein said rotor is formed with seal slots on opposite sides of each one of the plurality vane-receiving slots and mounted in each seal slot is an elongate wave spring and an elongate slot seal biased by its respective wave spring into a sealing arrangement with an adjacent side of its respective vane.

* * * * *